(12) United States Patent
Lin

(10) Patent No.: US 6,413,004 B1
(45) Date of Patent: Jul. 2, 2002

(54) TUBULAR CONNECTOR

(76) Inventor: Wen-Pin Lin, No. 30, Chien-Yung St. Tung Dist., Taichung City (TW)

( * ) Notice: Subject to any disclaimer, the term of this patent is extended or adjusted under 35 U.S.C. 154(b) by 0 days.

(21) Appl. No.: 09/725,387

(22) Filed: Nov. 29, 2000

(51) Int. Cl.[7] ................................................ F16B 7/10
(52) U.S. Cl. ...................... 403/176; 403/217; 403/329; 403/171; 403/292
(58) Field of Search ........................... 403/109.2, 109.3, 403/109.5, 170, 171, 176, 205, 217, 219, 104, 326, 329, 292, 295

(56) References Cited

U.S. PATENT DOCUMENTS

| | | | | |
|---|---|---|---|---|
| 2,982,586 A | * | 5/1961 | Gliebe ...................... 403/109.3 |
| 4,711,595 A | * | 12/1987 | Magid et al. ........... 403/205 X |
| 4,922,587 A | * | 5/1990 | Pettit ....................... 403/292 X |
| 5,031,266 A | * | 7/1991 | Tillman et al. .......... 403/329 X |
| 5,144,780 A | * | 9/1992 | Gieling et al. ........... 403/295 X |
| 5,174,676 A | * | 12/1992 | Welsch et al. ........... 403/292 X |
| 5,209,599 A | * | 5/1993 | Kronenberg ............ 403/292 X |
| 5,531,464 A | * | 7/1996 | Maurer et al. .......... 403/217 X |
| 5,641,237 A | * | 6/1997 | Albert et al. ................ 403/372 |

* cited by examiner

Primary Examiner—Lynne H. Browne
Assistant Examiner—John Cottingham
(74) Attorney, Agent, or Firm—Jenkens & Gilchrist, P.C.

(57) ABSTRACT

A tubular connector includes a tubular member and a retaining member. The tubular member includes proximate and distal tubular ends, and an intermediate portion interposed therebetween. The intermediate portion has an outer surrounding wall surface which is formed with two slits and a transverse slit inter-communicated with the two slits to thereby form a resilient tongue portion. The retaining member is disposed on the resilient tongue portion to be adapted to engage an engaging hole in a rod member.

4 Claims, 6 Drawing Sheets

TUBULAR CONNECTOR

BACKGROUND OF THE INVENTION

1. Field of the Invention

The invention relates to a tubular connector adapted to be connected to a tubular end of a rod member, more particularly to a tubular connector having a resilient tongue portion with a retaining member thereon to facilitate engagement with and disengagement from the rod member.

2. Description of the Related Art

Tubular connectors have wide applications. They can be found in pipeline connection, frameworks, playground facilities, etc.

With reference to FIG. 1, a conventional tubular connector 20 is adapted to interconnect rod members 10 of a framework. The tubular connector 20 is provided with a desired number of connecting sections 21 with an external diameter slightly smaller than the internal diameter of the rod member 10. During assembly of the framework, the rod members 10 are interconnected by sleeving end portions 11 of each rod member 10 on the connecting sections 21 of the respective tubular connectors 20. In order to ensure firm engagement of the rod members 10 and the tubular connectors 20, the connecting sections 21 and the rod members 10 have to be dimensioned to be press-fittable relative to each other. As such, engagement and disengagement of the rod members 10 and the tubular connectors 20 are not easy. If, for purposes of facilitating assembly, the connecting sections 21 and the rod members 10 are not configured to be press-fittable relative to each other, the resulting framework will not have sufficient structural strength to withstand heavy loads, and is susceptible to collapse.

SUMMARY OF THE INVENTION

Therefore, the main object of the present invention is to provide a tubular connector to facilitate engagement with and disengagement from a tubular rod member.

Accordingly, a tubular connector of this invention is adapted to be connected to a tubular end of a rod member. The tubular end of the rod member has first outer and inner surrounding wall surfaces opposite to each other and surrounding a first axis. The first inner surrounding wall surface defines an engaging hole extending radially to be communicated with the first outer surrounding wall surface. The tubular connector includes a tubular member and a retaining member. The tubular member includes proximate and distal tubular ends opposite to each other in a longitudinal direction, and an intermediate portion interposed therebetween. The intermediate portion has second outer and inner surrounding wall surfaces opposite to each other and surrounding a second axis which is parallel to the longitudinal direction. The second outer surrounding wall surface is formed with two slits and a transverse slit. The two slits are spaced apart from each other in a transverse direction relative to the longitudinal direction, and extend respectively and radially to be communicated with the second inner surrounding wall surface and in the longitudinal direction. The transverse slit extends radially to be communicated with the second inner surrounding wall surface and in the transverse direction so as to inter-communicate the two slits at a position adjacent to the distal tubular end, thereby forming a resilient tongue portion. The retaining member is disposed on the resilient tongue portion, and has a front wall surface, a rear retaining wall surface opposite to the front wall surface in the longitudinal direction, and an intermediate wall surface interposed therebetween. The front wall surface and the rear retaining wall surface are respectively proximate to the distal and proximate tubular ends of the tubular member. The rear retaining wall surface extends radially and outwardly from the second outer surrounding wall surface of the intermediate portion at the resilient tongue portion, and is biased by the resilient tongue portion to move radially and outwardly. The tubular member is of such a dimension that when the distal tubular end is adapted to be brought to move along the first inner surrounding wall surface of the rod member while the second axis is aligned with the first axis, the retaining member will be depressed by the first inner surrounding wall surface of the rod member against biasing action of the resilient tongue portion until the rear retaining wall surface reaches the engaging hole and is biased by the resilient tongue portion to move radially and outwardly so as to be retained in the engaging hole.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
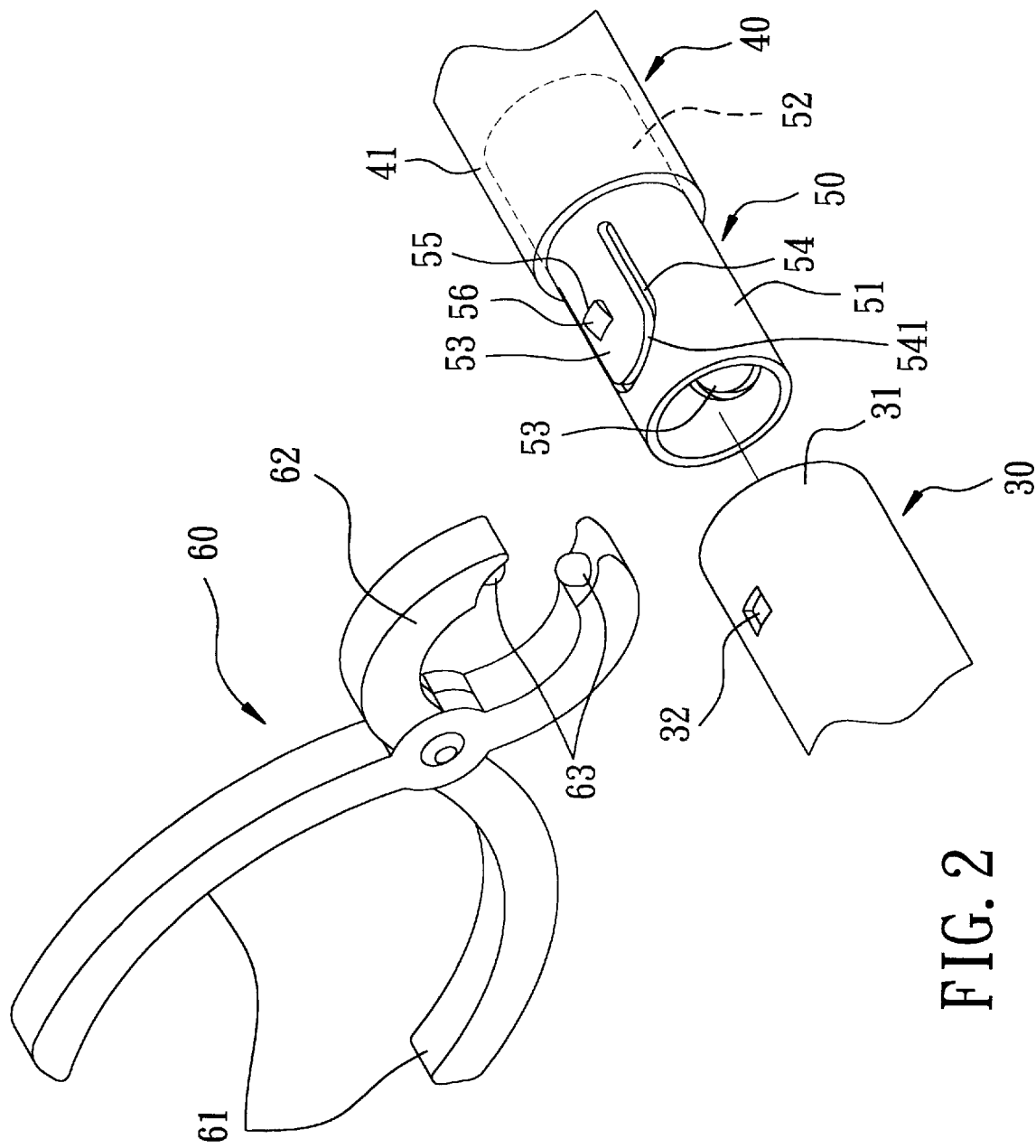
FIG. 2 is a fragmentary, exploded perspective view of the preferred embodiment of a tubular connector according to the invention used to interconnect a rod member and a tube coupling member and of a tool specific for the tubular connector.
Figure 3:
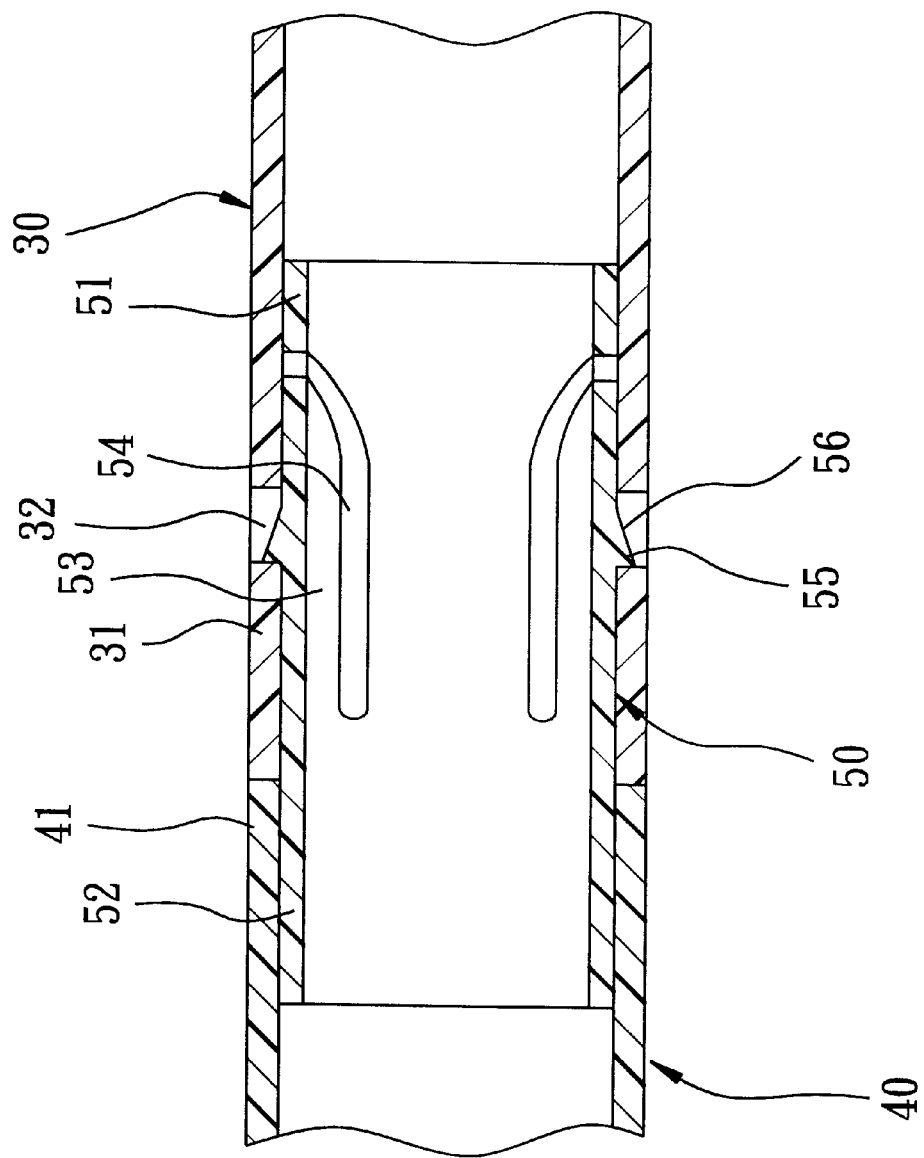
FIG. 3 is a fragmentary sectional view illustrating assembly of the tubular connector to the rod member and the tube coupling member.
Figure 4:
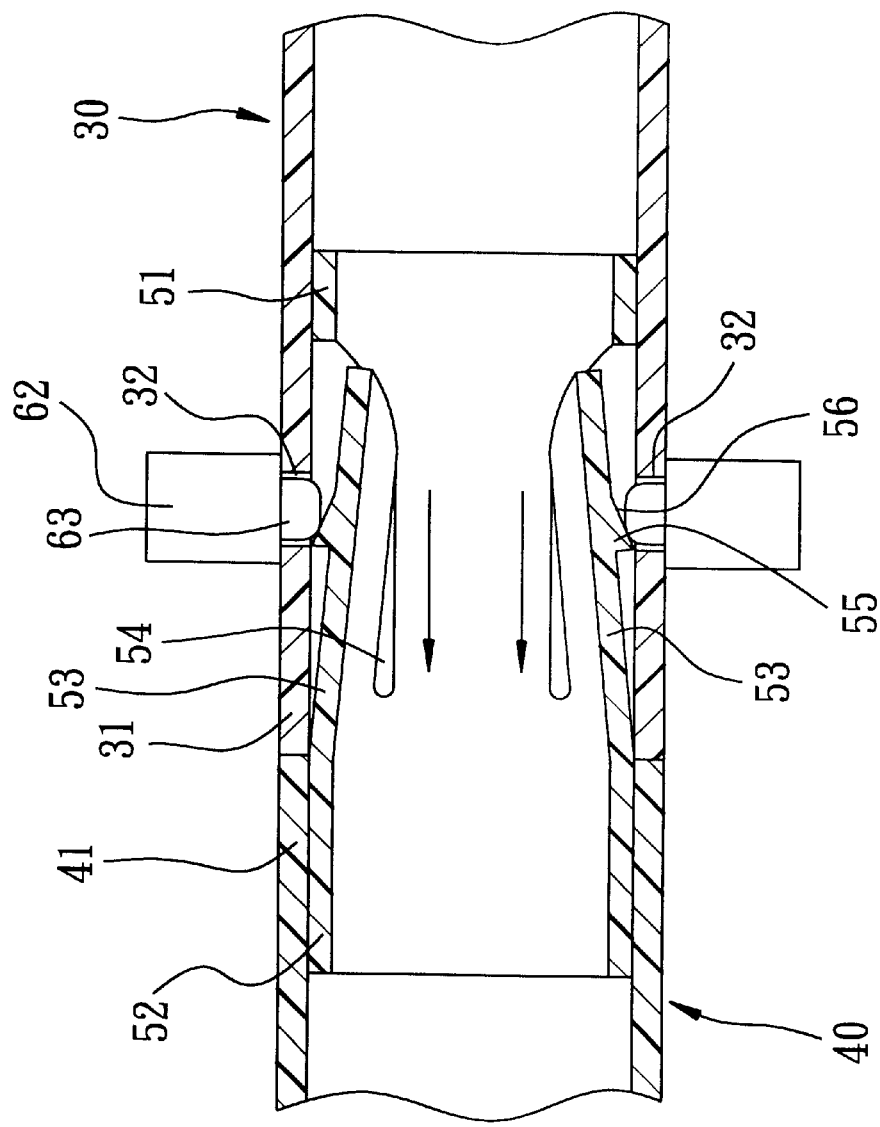
FIG. 4 is a view similar to FIG. 3, but illustrating disassembly of the preferred embodiment from the rod member using the tool.

Referring to FIGS. 2, 3 and 4, the preferred embodiment of a tubular connector according to the present invention is adapted to interconnect a tubular end of a hollow rod member 30 and a tubular portion 41 of a tube coupling member 40. As shown, the tubular end of the rod member 30 includes first outer and inner surrounding wall surfaces opposite to each other and surrounding a first axis. The first inner surrounding wall surface has a first dimension, and defines first and second engaging holes 32 (see FIGS. 3 and 4) extending radially to be communicated with the first outer surrounding wall surface.

The tubular connector is shown to include a tubular member 50 and two retaining members 55. The tubular member 50 includes proximate and distal tubular ends 52, 51 opposite to each other in a longitudinal direction, and an intermediate portion interposed therebetween. The proximate tubular end 52 is adapted to press fit into the tubular portion 41 of the tube coupling member 40. The intermediate portion has second outer and inner surrounding wall surfaces opposite to each other and surrounding a second axis which is parallel to the longitudinal direction. First and second resilient tongue portions 53 are formed on the intermediate portion of the tubular member 50, and are disposed diametrically opposite to each other. As the first and second resilient tongue portions 53 are identical, the construction thereof will now be described with respect to the first resilient tongue portion 53 only. The outer surrounding wall surface of the intermediate portion is formed with two slits 54 which are spaced apart from each other in a transverse direction relative to the longitudinal direction and which extend respectively and radially to be communicated with the second inner surrounding wall surface and in the longitudinal direction, and a transverse slit 541 which extends radially to be communicated with the second inner surrounding wall surface and in the transverse direction to inter-communicate the two slits 54 at a position adjacent to the distal tubular end 51, thereby forming the first resilient tongue portion 53.

The retaining members 55 are respectively disposed on the first and second resilient tongue portions 53. Each of the retaining members 55 includes a front wall surface, a rear retaining wall surface opposite to the front wall surface in the longitudinal direction, and an intermediate wall surface 56 interposed therebetween. The front wall surface and the rear retaining wall surface are opposite to each other in the longitudinal direction and are respectively proximate to the distal and proximate tubular ends of the tubular member 50. The intermediate wall surface 56 extends gradually downward from the rear retaining wall surface to the front wall surface. The rear retaining wall surface extends radially and outwardly from the second outer surrounding wall surface of the intermediate portion of the tubular member 50 at a respective one of the first and second resilient tongue portions 53, and is biased by the respective one of the first and second resilient tongue portions 53 to move radially and outwardly. The tubular member 50 is of such a dimension that when the distal tubular end 51 is adapted to be brought to move along the first inner surrounding wall surface of the rod member 30 while the second axis is aligned with the first axis, a respective one of the retaining members 55 will be depressed by the first inner surrounding wall surface of the rod member 30 against biasing action of the respective one of the first and second resilient tongue portions 55 until the rear retaining wall surface is aligned with a respective one of the first and second engaging holes 32 in the rod member 30 and is biased by the respective one of the first and second resilient tongue portions 53 to move radially and outwardly so as to be retained in the respective one of the first and second engaging holes 32.

Figure 1:
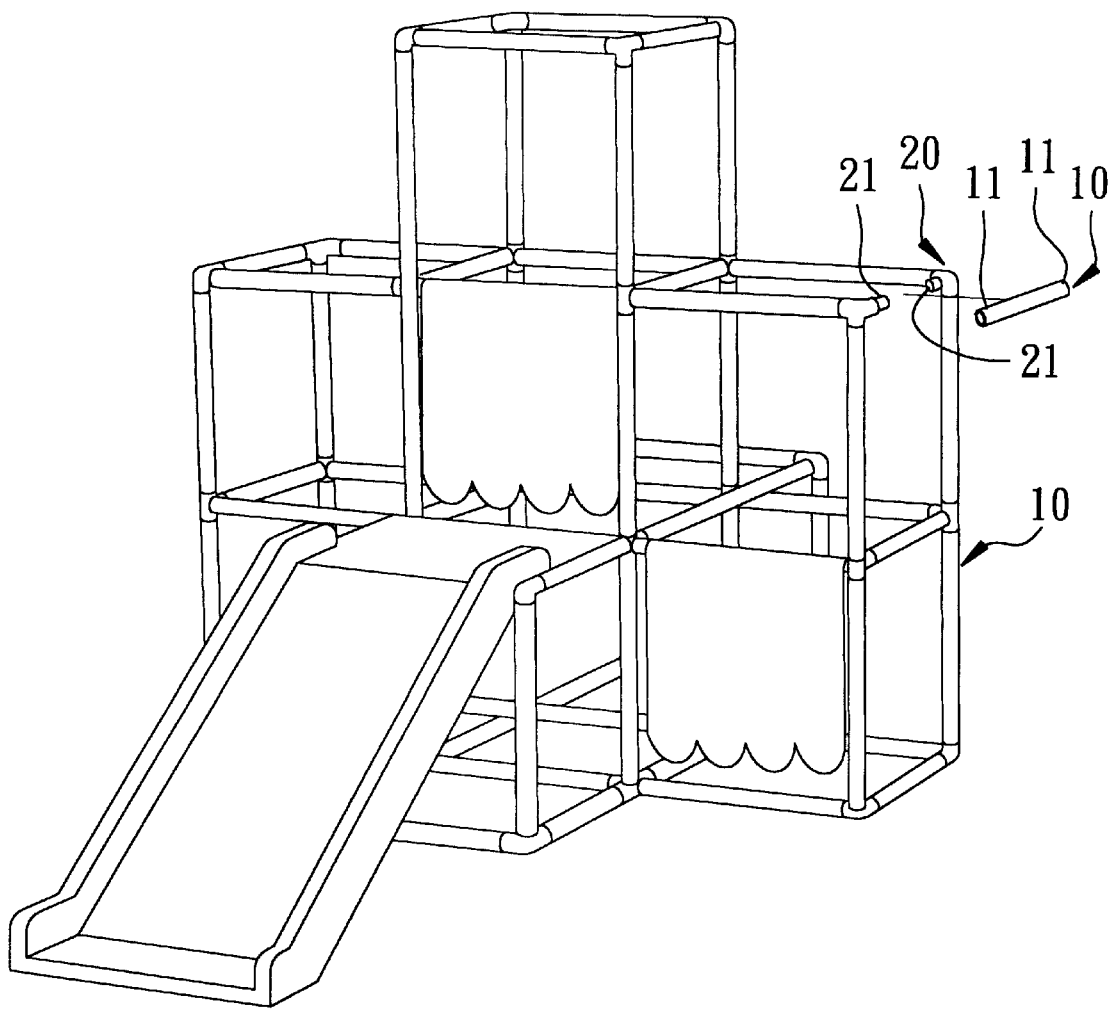
FIG. 1 is a partly exploded perspective view illustrating conventional tubular connectors used in the connection of rod members in a framework.

The tubular connector of this invention is adapted for use with a tool 60 specific therefor. With additional reference to FIG. 1, the tool 60 includes a pair of lever members and two releasing protrusions 63. The lever members are pivotally mounted to each other about a pivotal axis to form left and right jaw portions 62 at one side of the pivotal axis and right and left handle portions 61 at the other side of the pivotal axis. The lever members are disposed such that when one of the right and left handle portions 61 is turned about the pivotal axis and is moved toward the other one of the right and left handle portions 61, a respective one of the left and right jaw portions 62 is moved toward the other one of the left and right jaw portions 62. The releasing protrusions 63 are disposed respectively on front end portions of the left and right jaw portions 62 such that when the left and right jaw portions 62 are brought by the handle portions 61 to embrace the second outer surrounding wall surface of the intermediate portion of the tubular member 50, the releasing protrusions 63 are brought to depress the two retaining members 55 on the first and second resilient tongue portions 53 to facilitate disengagement of the retaining members 55 from the first and second engaging holes 32, respectively.

In use, the proximate tubular end 52 of the tubular member 50 is press fitted into the tubular portion 41 of the tube coupling member 40. Then, the distal tubular end 52 and the intermediate portion of the tubular member 50 are inserted into the tubular end 31 of the rod member 30 such that the two retaining members 55 on the first and second resilient tongue portions 53 engage the first and second engaging holes in the rod member 30, respectively. As such, the tubular member 50 can be tightly coupled with the rod member 30 and the tube coupling member 40. To disassemble the tubular member 50 from the rod member 30, the tool 60 is used to depress the retaining members 55 projecting from the first and second engaging holes 32 with the releasing protrusions 63 to thereby disengage the retaining members 55 from the first and second engaging holes 32 for removal of the tubular member 50 from the rod member 30.

Figure 5:
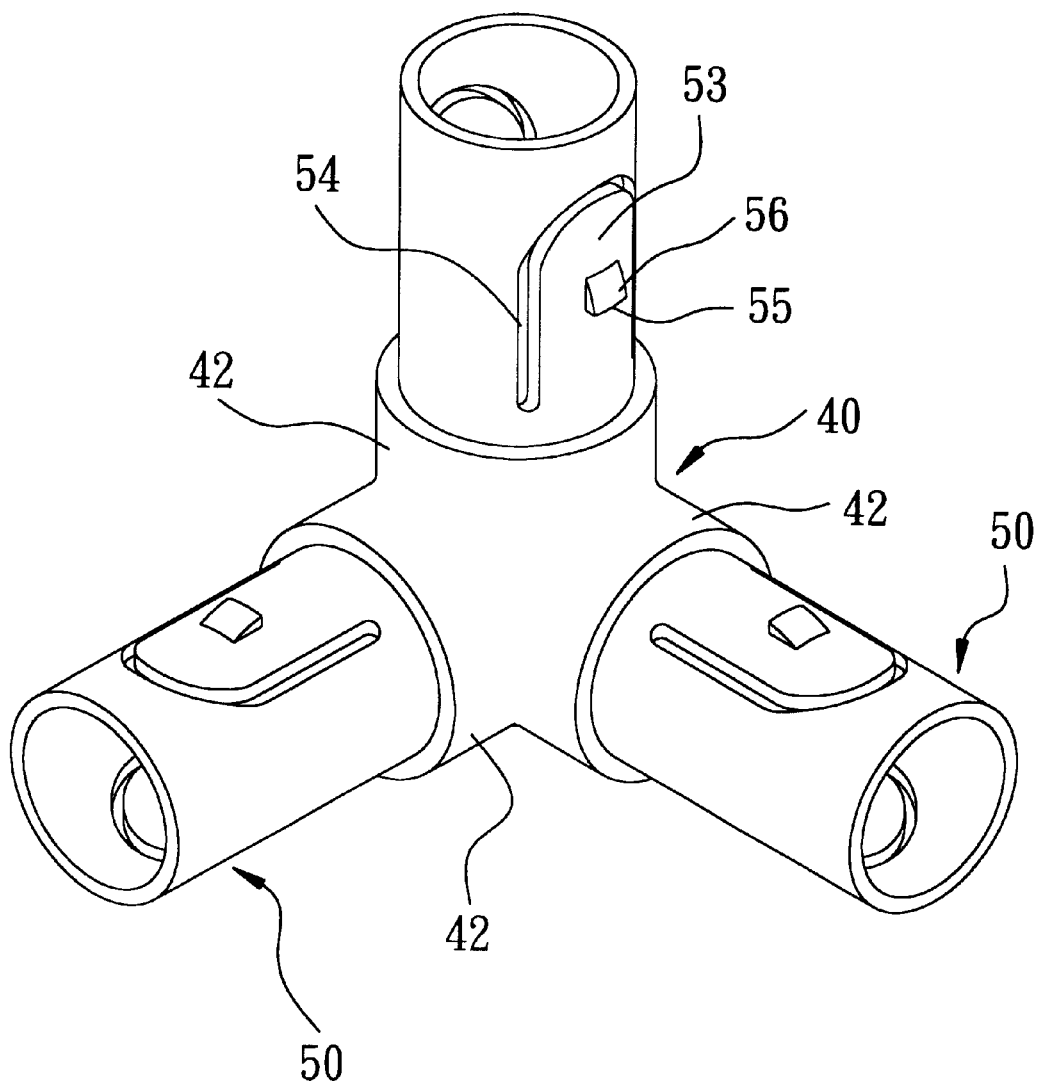
FIGS. 5 and 6 are perspective views illustrating assembly of a plurality of tubular connectors of the present invention to a tube coupling member with a plurality of tubular portions.
Figure 6:
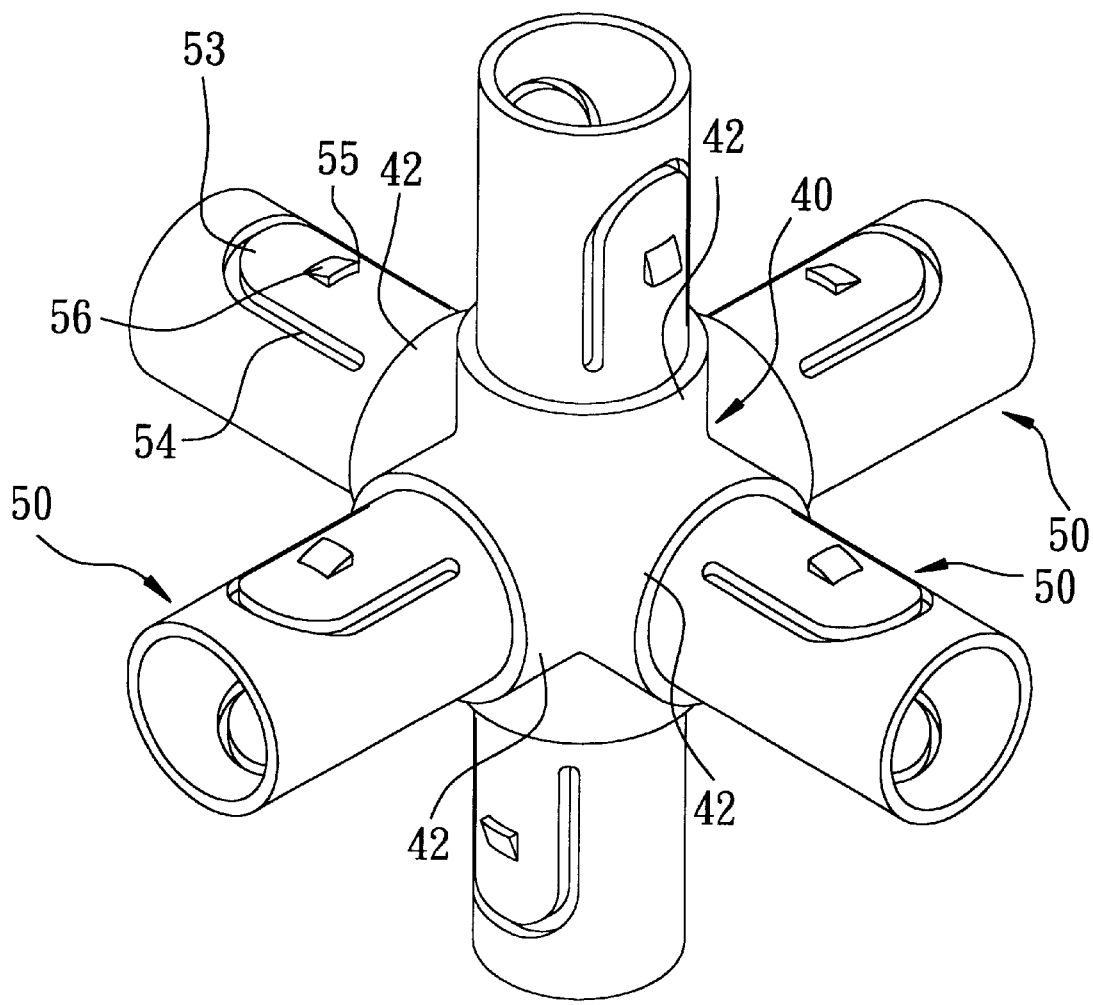

Referring to FIGS. 5 and 6, the tubular connector of this invention may be adapted to be connected to a tube coupling member 40 with three or six tubular portions 42.

By virtue of the resilient tongue portions and the retaining members thereon, the tubular connector can be easily coupled with or disengaged from the rod member and the tube coupling member while ensuring tight connection.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A tubular connector and tool assembly, comprising:
    a tubular connector which is adapted to be connected to a tubular end of a rod member, the tubular end of the rod member having first outer and inner surrounding wall surfaces opposite to each other and surrounding a first axis, the first inner surrounding wall surface defining a first engaging hole extending radially to be communicated with the first outer surrounding wall surface, said tubular connector including
    a tubular member including proximate and distal tubular ends opposite to each other in a longitudinal direction, and an intermediate portion interposed therebetween, said intermediate portion having second outer and inner surrounding wall surfaces opposite to each other and surrounding a second axis which is parallel to the longitudinal direction, said second outer surrounding wall surface being formed with two slits that are spaced apart from each other in a transverse direction relative to the longitudinal direction and that extend respectively and radially to be communicated with said second inner surrounding wall surface and in the longitudinal direction, and a transverse slit extending radially to be communicated with said second inner surrounding wall surface and in the transverse direction so as to inter-communicate said two slits at a position adjacent to said distal tubular end, thereby forming a first resilient tongue portion; and
    a first retaining member disposed on said first resilient tongue portion and having a front wall surface, a rear retaining wall surface opposite to said front wall surface in the longitudinal direction, and an intermediate wall surface interposed therebetween, said front wall surface and said rear retaining wall surfaces being respectively proximate to said distal and proximate tubular ends of said tubular member, said rear retaining wall surface extending radially and outwardly from said second outer surrounding wall surface of said intermediate portion at said first resilient tongue portion and being biased by said first resilient tongue portion to move radially and outwardly, wherein said tubular member is of such a dimension that when said distal tubular end is adapted to be brought to move along the first inner surrounding wall surface of the rod member while the second axis is aligned with the first axis, said first retaining member will be depressed by the first inner surrounding wall surface of the rod member against biasing action of said first resilient tongue portion until said rear retaining wall surface reaches said first engaging hole and is biased by said first resilient tongue portion to move radially and outwardly so as to be retained in the first engaging hole; and a tool including a pair of lever members pivotally mounted to each other about a pivotal axis to form left and right jaw portions at one side of the pivotal axis and right and left handle portions at the other side of the pivotal axis, said lever members being disposed such that when one of said right and left handle portions is turned about the pivotal axis and moved toward the other of said right and left handle portions, a respective one of said left and right jaw portions is moved toward the other one of said left and right jaw portions and at least one releasing protrusion disposed on one of said left and right jaw portions such that when said left and right jaw portions are brought by said handle portions to embrace said second outer surrounding wall surface of said intermediate portion of said tubular member, said at least one releasing protrusion is brought to depress said first retaining member to facilitate disengagement of said first retaining member from the first engaging hole.

2. The tubular connector and tool assembly of claim 1, wherein said intermediate wall surface of said first retaining member inclines gradually downward from said rear retaining wall surface to said front wall surface.

3. The tubular connector and tool assembly of claim 2, wherein said tubular member includes a second resilient tongue portion of a construction identical to said first resilient tongue portion and disposed diametrically opposite to said first resilient tongue portion, said tubular connector further including a second retaining member disposed on said second resilient tongue portion adapted to engage a second engaging hole in the tubular end of the rod member, said second retaining member having a construction identical to said first retaining member.

4. The tubular connector and tool assembly of claim 3, wherein said proximate tubular end of said tubular member is adapted to press fit into a tubular portion of a tube coupling member.

* * * * *